United States Patent [19]

Matsuyama et al.

[11] Patent Number: 5,745,052
[45] Date of Patent: Apr. 28, 1998

[54] PARKING LOT CONTROL SYSTEM

[75] Inventors: Yasuo Matsuyama; Michio Kimoto, both of Yokohama; Masaru Iyama, Ebina, all of Japan

[73] Assignee: Matsushita Electric Industrial Co., Ltd., Osaka, Japan

[21] Appl. No.: 665,444

[22] Filed: Jun. 18, 1996

[30] Foreign Application Priority Data

Jun. 23, 1995 [JP] Japan ................................ 7-158200

[51] Int. Cl.$^6$ .................................................. B60Q 1/48
[52] U.S. Cl. ...................... 340/932.2; 348/148; 348/150; 235/375; 235/380; 364/467
[58] Field of Search ................................ 340/932.2, 928; 235/384, 380, 375; 348/148, 149, 150, 135; 364/467

[56] References Cited

U.S. PATENT DOCUMENTS

| 4,571,490 | 2/1986 | Hidemi et al. | 235/384 |
| 4,603,390 | 7/1986 | Mehdipour et al. | 364/467 |
| 5,414,624 | 5/1995 | Anthonyson | 364/424.01 |

FOREIGN PATENT DOCUMENTS 3-177988A 8/1991 Japan .
5-2699A 1/1993 Japan .

Primary Examiner—Thomas Mullen
Assistant Examiner—Julie B. Lieu
Attorney, Agent, or Firm—Watson Cole Stevens Davis, P.L.L.C.

[57] ABSTRACT

When a car is to enter a parking lot, an image of a number plate of the car is picked up by an image pickup device, and a car number of the car is recognized. The recognized number and the entry time are stored in a central processing unit, and a parking ticket is dispensed for the car, and the car is allowed to enter the parking lot. If there is any service to be offered to customers at the time of parking, service information is inputted to the central processing unit directly from a service counter, and therefore the central processing unit effects a service processing such as a parking fee discount processing. The image of the number plate of the departing car is picked up, and the car number is recognized, and it is judged whether or not the car is entitled to the fee adjustment. If this judgment result is in the affirmative, the central processing unit determines the parking time in accordance with the parking ticket number, the recognized car number and the departure time, and determines the final parking fee, taking the above service into account. Then, when the parking fee is paid, the car is allowed to depart from the parking lot.

8 Claims, 7 Drawing Sheets

FIG.2

20 REFERENCE TABLE

| CAR NUMBER (21) | EFFECTIVE DATE (22) | SPECIFIED CAR INDICATION PORTION (23) | |
|---|---|---|---|
| 24a | | | |
| 24b | | | |
| 24c | | | |
| | | | |
| | | | |

FIG.3

25 STORAGE TABLE

| PARKING TICKET NUMBER (26) | CAR NUMBER (27) | ENTRY TIME (28) | EFFECTIVE TIME (29) | DEPARTURE TIME (30) | (32) |
|---|---|---|---|---|---|
| 31a | | | | | |
| 31b | | | | | |
| 31c | | | | | |
| | | | | | |
| | | | | | |

FIG.7

| PARKING TICKET | CAR NUMBER | ENTRY TIME | EFFECTIVE TIME | DEPARTURE TIME | |
|---|---|---|---|---|---|
| 0001 | 1234 | 10:12 | | | |
| | | | | | |
| | | | | | |
| | | | | | |
| | | | | | |

FIG.8

| PARKING TICKET | CAR NUMBER | ENTRY TIME | EFFECTIVE TIME | DEPARTURE TIME | |
|---|---|---|---|---|---|
| 0001 | 1234 | 10:12 | 12:12 | | |
| 0002 | 5678 | 10:25 | | | |
| | | | | | |
| | | | | | |
| | | | | | |

FIG.9

| PARKING TICKET | CAR NUMBER | ENTRY TIME | EFFECTIVE TIME | DEPARTURE TIME | |
|---|---|---|---|---|---|
| 0001 | 1234 | 10:12 | 12:12 | 11:55 | |
| 0002 | 5678 | 10:25 | 13:25 | | |
| | | | | | |
| | | | | | |
| | | | | | |

PARKING LOT CONTROL SYSTEM

BACKGROUND OF THE INVENTION

This invention relates to a parking lot control system and an apparatus used for this system, and more particularly to a parking lot control system and apparatus which enable cars to promptly come into and out of the parking lot.

There have heretofore been proposed various parking lot control systems particularly of the type in which the parking of a car between the entry to a parking lot to the departure from the parking lot is controlled, and a parking fee is collected. Examples of such parking lot control systems are disclosed in Japanese Patent Unexamined Publication Nos. 3-177988 and 5-2699. In the former parking lot control system, a car pickup camera is provided at an entrance/exit of the parking lot, and the image of a number plate of an entering and departing car is picked up by the camera, and this picked-up image is fed to a car number recognition device connected to the car pickup camera. This car number recognition device recognizes the car number by the picked-up image, and feeds recognition data to a parking lot control apparatus connected to the car number recognition device. This parking lot control apparatus calculates the time of parking of the car in the parking lot, and calculates a parking fee for this car in accordance with the calculated parking time data and car kind information contained in the number plate. The latter parking lot control system is generally similar to the former parking lot control system. In this latter control system, also, a car pickup camera is provided at an entrance/exit of a parking lot, and the image of a number plate of an entering and departing car is picked up, and this picked-up image is fed to a number recognition portion connected to the car pickup camera, and in accordance with this plate number, the entry and departure of the car, the parking fee and so on are controlled.

However, the control systems of the parking lot largely differ depending on the place and condition in which the parking lot is installed. For example, there are parking lot owners who rent a parking space purely for parking purposes, and charge parking fees. Also, there are those who provide a parking lot merely for the convenience of contractors or customers, for example, who come to a department store or a shopping center to delivery or purchase goods. The former and the latter charge the fees differently, and the former charges the fee for the parking from the entry to the departure whereas the latter makes no charge within a predetermined parking time. In the latter case, generally, the number of cars coming into and out of the parking lot, as well as kinds of the cars, is large, and therefore it is important to promptly allow the cars to come into and out of the parking lot in order to satisfy the customers. Although the above conventional parking lot control systems have an advantage that cumbersome procedures can be omitted by the computer-controlled system performed in accordance with the picked-up and recognized car numbers, the calculation of the parking fee for each car is made when the car is going out of the parking lot. Therefore, the checking of receipt, the calculation of the parking fee and the collection of the fee have all been effected at the exit of the parking lot, and this has led to a disadvantage that the exit has been crowded with the cars.

And besides, the conventional parking lot control systems have not been provided with any means for judging the career of many unspecified cars (that is, for judging whether or not the car is some specified car), and therefore have been found not entirely satisfactory from the viewpoint of security.

SUMMARY OF THE INVENTION

With the above problems in view, it is a first object of this invention to provide a parking lot control system as well as a parking lot control apparatus, in which the control of the parking lot is effected in accordance with a picked-up, recognized car number and a parking ticket number, and a fee adjustment processing or a discount processing can be effected during the time period from the entry of a car into a parking lot to the departure of the car from the parking lot.

A second object of the invention is to provide a parking lot control system, as well as a parking lot control apparatus, capable of judging whether or not each of many unspecified cars to enter the parking lot is a contract car or some specified car.

According to a first aspect of the present invention, there is provided a parking lot control system comprising:

means provided at an entrance of a parking lot for picking up an image of a number plate of a car to enter the parking lot;

means provided at the entrance of the parking lot for recognizing a car number of the entering car;

means provided at the entrance of the parking lot for dispensing a parking ticket;

a central processing unit provided in a control room for storing the car number of the entering car, the number of the parking ticket and a time of entry of the car into the parking lot;

means provided at a service department of a parking lot-containing facility for effecting an intermediate fee adjustment processing or a discount processing in accordance with data of the parking ticket and data of a receipt, results of the processings being stored in the central processing unit;

means provided at an exit of the parking lot for picking up the image of the number plate of the car to depart from the parking lot;

means provided at the exit of the parking lot for recognizing the car number of the departing car; and means provided at the exit of the parking lot for automatically effecting a final parking fee adjustment in accordance with the data from the central processing unit.

Preferably, a time of departure of the car (whose number has been recognized) from the parking lot is stored in the central processing unit, and based on the car number and the parking ticket number, all parking information is stored as storage data in the central processing unit.

According to a second aspect of the invention, in the above parking lot control system, the image of the number plate of the entering car is picked up, and the car number is recognized, and the central processing unit, provided in the control room, compares the car number of the entering car with preformed reference data, relating to contract cars and specified cars, to determine whether or not the entering car is any one of the specified cars and contract cars.

According to a third aspect of the invention, there is provided a parking lot control apparatus comprising:

means provided at an entrance of a parking lot for picking up an image of a number plate of a car to enter the parking lot;

means provided at the entrance of the parking lot for recognizing a car number of the entering car;

means provided at the entrance of the parking lot for dispensing a parking ticket;

means provided at an exit of the parking lot for picking up the image of the number plate of the car to depart from the parking lot;

means provided at the exit of the parking lot for recognizing the car number of the departing car;

means provided at the exit of the parking lot for automatically effecting a parking fee adjustment; and a central processing unit for controlling the parked car in accordance with the car number and a number of the parking ticket, the central processing unit including a reference table for judging whether or not the entering car is a contract car, and a storage table for storing parking control data of all of the cars which have entered the parking lot.

In the parking lot control apparatus, means is preferably provided at a service department of a parking lot-containing facility for effecting an intermediate fee adjustment processing including a processing by which an effective parking time is computed in accordance with the parking ticket and a receipt. The intermediate fee adjustment processing can include a parking fee discount calculation processing for extending the effective parking time. Data, representing the car numbers of the contract cars and effective contract time limits thereof, can be stored in the reference table. In addition to the data representing the car numbers of the contract cars and effective contract time limits thereof, data representing car numbers of other specified cars (e.g. stolen cars), can be stored in the reference table. At least data, representing the number of the parking ticket, the car number of each parked car, the entry time thereof, the effective parking time thereof and the departure time thereof, are stored in the storage table.

In the parking lot control system and apparatus according to the present invention, the image of the number plate of the entering car is picked up, and the parking ticket is dispensed for the entering car. Also, the car number (i.e., the number plate) is recognized in accordance with the picked-up image, and comparing this car number with the data in the reference table, the central processing unit judges whether the entering car is a contract car, a specified car or an ordinary car. Based on results of the foregoing, the central processing unit prepares the storage table, and at the time of entry of the car into the parking lot, the parking ticket number, the car number and the entry time are first written into the storage table. If the car is a specified car, data, indicating that the car is the specified car, is written into the storage table. When the parking ticket and the receipt are passed to the service department during the time period between the entry and departure of the car, this car is identified from the parking ticket number, and the intermediate fee adjustment means computes the effective parking time in accordance with the receipt, and results thereof are written into the storage table. When the car is to depart from the parking lot, the image of the number plate of the car is picked up, and the car number is recognized in accordance with this picked-up image. The car is identified from the recognized car number, and it is checked whether or not the present time is within the effective parking time, and then the final fee adjustment is effected. The departure time is written into the storage table if necessary, and with the aid of the central processing unit, all the data, obtained based on the car number and the parking ticket number, are stored as storage data for a predetermined time period or semipermanently.

BRIEF DESCRIPTION OF THE DRAWINGS

FIG. 2 is a diagram of a reference table incorporated in a central processing unit of the parking lot control apparatus;

FIG. 3 is a diagram of a storage table incorporated in the central processing unit;

FIG. 7 is a diagram showing the storage table in which a car number, an entry time and a parking ticket number are written respectively in a car number registration portion, an entry time registration portion and a parking ticket registration portion by the car entry processing;

FIG. 8 is a diagram showing the storage table in which the car number, the entry time, the parking ticket number and an effective parking time are written respectively in the car number registration portion, the entry time registration portion, the parking ticket registration portion and an effective time registration portion by the intermediate fee adjustment processing; and FIG. 9 is a diagram showing the storage table in which the car number, the entry time, the parking ticket number, an effective parking time and a departure time are written respectively in the car number registration portion, the entry time registration portion, the parking ticket registration portion, the effective time registration portion and a departure time registration portion by the intermediate fee adjustment processing.

DESCRIPTION OF THE PREFERRED EMBODIMENTS

Figure 1:
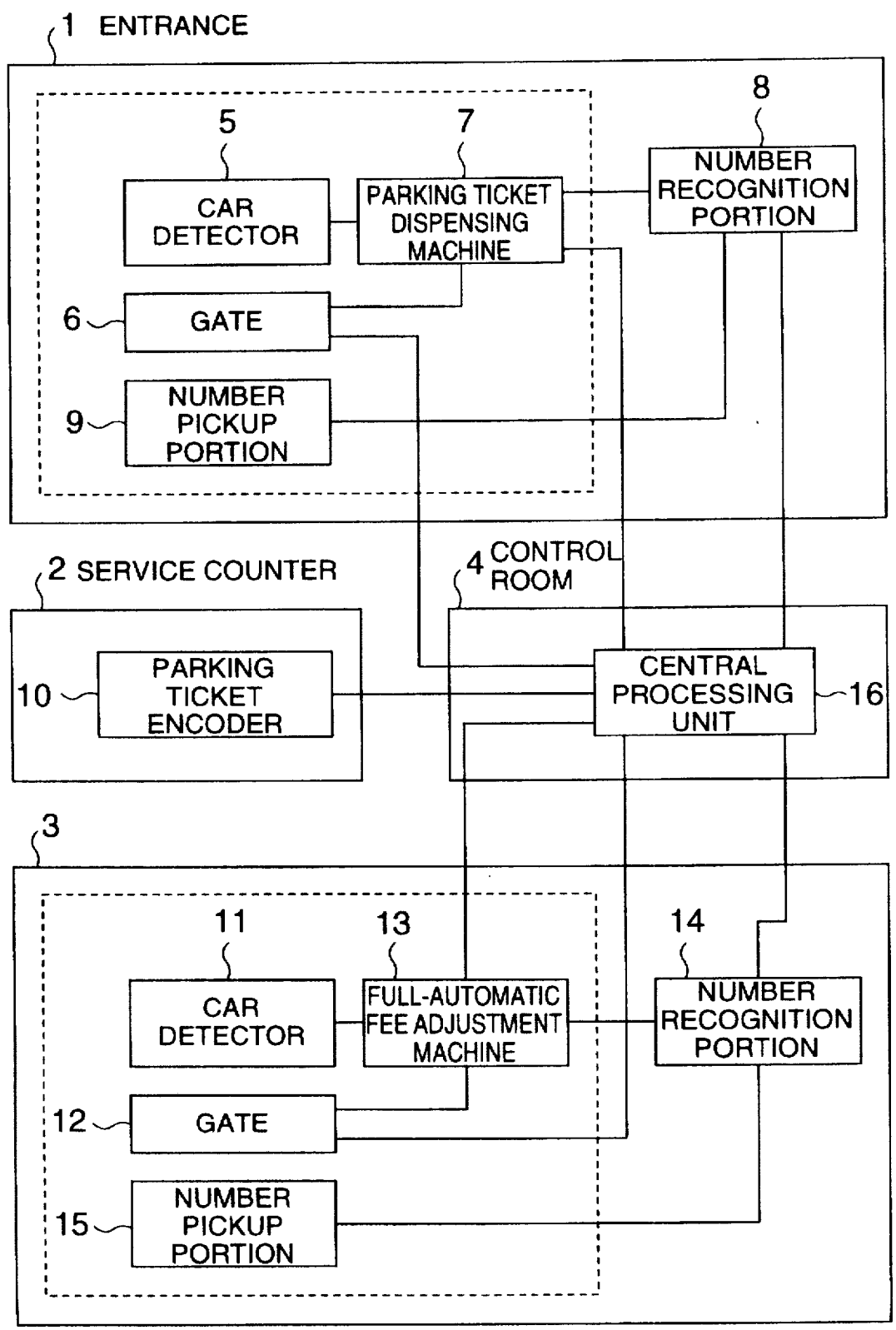
FIG. 1 is a functional block diagram of a parking lot control apparatus of the present invention.

One preferred embodiment of a parking lot control system (and apparatus) of the present invention will now be described with reference to the drawings. FIG. 1 is a functional block diagram of the parking lot control apparatus of the invention. This parking lot control apparatus is installed mainly in a parking lot provided in a department store or a shopping center. In FIG. 1, reference numeral 1 denotes a parking lot control unit for an entrance area of the parking lot, reference numeral 2 a service counter (service department) provided in a parking lot-containing facility (corresponding to the department store or the shopping center), reference numeral 3 a parking lot control unit for an exit area of the parking lot, and reference numeral 4 a control room for effecting the control of the parking lot.

The parking lot control unit 1 for the entrance area of the parking lot comprises a car detector (entering-car detection means) 5 for detecting the entry of a car, a gate 6 for opening and closing the entrance of the parking lot, a ticket dispensing machine 7 for dispensing a parking ticket for the car to enter the parking lot, a number recognition portion 8 for recognizing a plate number of the entering car, and a number pickup portion 9 for picking up the image of the plate number of the entering car. In this embodiment, the car detector 5 comprises a loop coil embedded, for example, in a floor, an ultrasonic detector, or an optical sensor. Usually, the car detector 5 comprises a pair of detectors provided respectively at the front and rear sides of the gate 6, and the complete entry of the car into the parking lot is detected through the operation of the pair of detectors. The parking ticket dispensing machine 7 dispenses the parking ticket in the form of a magnetic card relative to which data can be written and read, and necessary data, including a parking ticket number, are written in this parking ticket. The number pickup portion 9 comprises a car pickup camera.

A parking ticket encoder 10 is provided in the service counter 2, and this parking ticket encoder 10 identifies the relevant car in accordance with the parking ticket number recorded in the parking ticket, and reads contents of a receipt, and can input a parking-permitted time (effective parking time) for this car through operation of keys by the operator. This effective parking time may be determined uniformly for all cars without condition, or may be determined in accordance with various conditions. Examples of such conditions are as follows:

Condition 1: The effective parking time is 2 hours (that is, the parking is free of charge for 2 hours) if there is a receipt indicative of the purchase of goods regardless of the amount of paid money.

Condition 2: If the amount of money indicated in the receipt is not less than a predetermined amount (e.g., 5,000 yen,) the effective parking time is extended one hour, and further is increased one hour for each 5,000 yen increase.

Data concerning a discount processing can be inputted by the parking ticket encoder 10. In this discount processing, the effective parking time is increased, or the parking fee is discounted on particular days (for example, Sundays or national holidays) or at a specified time zone of the day. Examples of such discount are as follows:

A: The effective parking time is 30 minutes longer on Sundays and holidays than on weekdays.

B: The effective parking time is extended 30 minutes during a time period from 11 a.m. to 2 p.m. on Sundays and holidays (in order to provide sufficient time for lunch).

The parking lot control unit 3 for the exit area of the parking lot comprises a car detector 11 (which constitutes departing-car detection means, and is similar in construction to the above-mentioned car detector 5) for detecting the departure of the car, a gate 12 for opening and closing the exit of the parking lot, a fully-automatic fee adjustment machine 13 for effecting a final fee adjustment processing for the departing car, a number recognition portion 14 for recognizing the plate number of the departing car, and a number pickup portion 15 for picking up the image of the plate number of the departing car. In this parking lot control unit 3 for the exit area of the parking lot, the car detector 11 comprises a pair of detectors provided respectively at the front and rear sides of the gate 12 at the exit of the parking lot, and the complete departure of the car from the parking lot is detected through the operation of the pair of detectors. The fully-automatic fee adjustment machine 13 adjusts the parking fee, including a judgement of whether of not the present time is within the effective parking time period. The number pickup portion 15 comprises a car pickup camera.

A central processing unit 16 is provided in the control room 4. The central processing unit 16 controls the overall operation of the parking lot control apparatus, and also controls the parking of the cars parked in this parking lot. Therefore, data of the car numbers recognized by the number recognition portions 8 and 14 are fed to the central processing unit 16, and the inputted time data and discount data are fed from the parking ticket encoder 10 to the central processing unit 16. The central processing unit 16 feeds operation instruction signals to the number recognition portions 8 and 14 and the gates 6 and 12, respectively. The central processing unit 16 comprises a reference table (memory means) 20 (see FIG. 2) for beforehand storing data necessary for the parking control, and a storage table (memory means) 25 (see FIG. 3) for storing the data, fed respectively from the number recognition portions 8 and 14 and the parking ticket encoder 10, in a predetermined manner.

The reference table 20 is the memory means for storing data of specified cars such as contract cars and stolen cars for which the police is searching. The interior of the reference table 20 is divided into at least three data storage columns or portions, that is, a car number registration portion 21, an effective date registration portion 22 and a specified car indication portion 23. These data storage columns has data writing portions 24. In an example shown in FIG. 2, the car number "1375" of a registered car (that is, a contract car) is stored in the data writing portion 24a of the reference table 20, and its effective date (time limit) of "Aug. 31, 1995" is stored in this data writing portion. The car number "2468" of a contract car is stored in the data writing portion 24b, and its effective date (time limit) of "Dec. 31, 1995" is stored in this data writing portion 24b. These cars can come into and out of the parking lot freely (that is, free of charge) for parking purposes, and examples of these cars include goods delivery cars. The car number "2816" of a specified car is stored in the data writing portion 24c, and its effective date (time limit) registration column is blank, and flag "1" is indicated in the specified car indication portion. This indicates that this car is a suspicious car or a car for which the police is searching because of the stolen car or for other reason.

The storage table 25 is the memory means for storing parking control data of all of cars coming into and out of the parking lot, and as shown in FIG. 3, the interior of the storage table 25 is divided into at least five data storage columns or portions, that is, a parking ticket number registration portion 26, a car number registration portion 27, an entry time registration portion 28, an effective time registration portion 29 and a departure time registration portion 30. These data storage columns has data writing portions 31 for storing the parking control data of individual cars. In addition to the above registration portions 26 to 30, the storage table 25 may include a flag indication portion 32, and with respect to the specified car (the car for which the police is searching), a flag is set (that is, "1" is indicated) in the flag indication portion 32.

Figure 4:
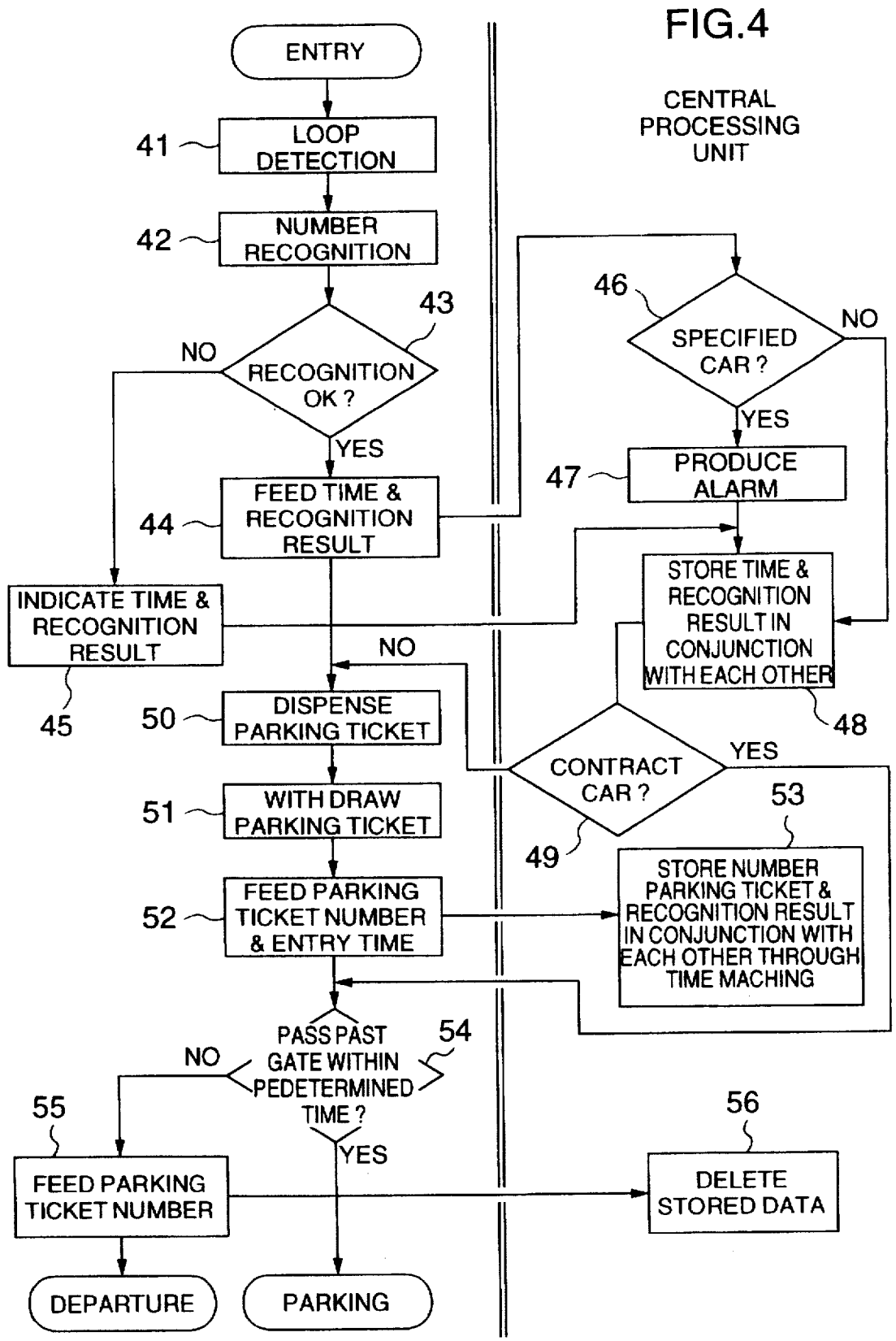
FIG. 4 is a flow chart showing a procedure of the processing effected by the parking lot control apparatus when a car enters a parking lot.

The operation of the parking lot control apparatus of the above construction will now be described. FIG. 4 is a flow chart showing a procedure of the processing effected by the parking lot control apparatus when a car enters the parking lot. In Processing Step (hereinafter referred to merely as "Step") 41 of this processing procedure or program, when a car is to enter the parking lot, the car detector (entering-car detection means) 5 detects the entry of the car, and its detection signal is fed to the number recognition portion 8, and in Step 41, the number recognition portion 8 begins a number recognition operation. In this number recognition operation, the number pickup portion 9 is operated in response to an instruction from the number recognition portion 8, and the car pickup camera of this number pickup portion 9 picks up the image of a number plate of the entering car, and data representative of this image is fed to the number recognition portion 8. The number recognition portion 8 effects a character recognition processing in accordance with the thus fed image data, and recognizes the car number.

Then, in Step 43, it is checked whether or not the number recognition has been effected. In this check processing, it is checked whether or not the car number has been perfectly recognized, and if the perfect recognition has been achieved, the processing program proceeds to Step 44 in which data representative of the entry time, as well as data representative of the result of the car number recognition, is fed to the central processing unit 16, and in Step 46, it is checked whether or not this entering car is a specified car. This check processing to determine whether or not the car is a specified car is carried out with reference to the data stored in the reference table 20. If it is found that the car is a specified car, the processing program proceeds to Step 47 in which an alarm is generated, and then in Step 48, the entry time and the result of the car number recognition are stored in the storage table 25 in conjunction with each other. The storage of the data of the cars in the storage table 25 is effected in the order of entry of the cars into the parking lot, and the parking control data of the first entering car is stored in the first portion (designated by 31a in FIG. 3) of the data writing portion 31. Therefore, until this stage, the data representative of the car number and the data representative of the entry time have been written respectively into those sections of the data writing portion 31a corresponding respectively to the car number registration portion 27 and the entry time registration portion 28. In contrast, if it is judged in Step 46 that the entering car is not a specified car, the processing program proceeds to Step 48 without giving an alarm, in which the entry time and the result of the car number recognition are stored in the storage table 25 in conjunction with each other.

The above storage processing is effected if it is judged in Step 43 that the plate number of the car has been perfectly recognized. In contrast, if it is judged in Step 43 that the plate number of the car has not been perfectly recognized, the processing program proceeds to Step 45 in which data representative of the entry time and data representative of the result of the car number recognition are fed to the central processing unit 16. In this case, although the result of recognition of the car number is imperfect, the data representative of this imperfect condition is fed to the central processing unit 16. If the result of the car number recognition is thus imperfect, it is not possible to check whether or not the car is a specified car as described above for Step 46, and therefore in this case the central processing unit 16 immediately causes the processing program to proceed to Step 48 in which the entry time and the result of the imperfect car number recognition are stored in the storage table 25 in conjunction with each other. Then, in Step 49, it is checked whether or not the entering car is a contract car or not, and if it is judged that the car is not a contract car, the processing program proceeds to Step 50 in which the parking ticket dispensing machine 7 is operated to dispense a parking ticket. Then, when the parking ticket is withdrawn from a dispensing slot in the parking ticket dispensing machine 7 in Step 51, this machine 7 feeds data representative of the number of the parking ticket and data representative of the entry time to the central processing unit 16 in Step 52, and in Step 53, taking the matching of the time, the central processing unit 16 stores the parking ticket number and the number recognition result in the storage table 25 in conjunction with each other. With the above processing procedure, until this stage, the car number data and the entry time data have been written respectively into those sections of the data writing portion 31a of the storage table 25 corresponding respectively to the car number registration portion 27 and the entry time registration portion 28, and in addition the data of the parking ticket number has been written into that section of the data writing portion 31a corresponding to the parking ticket number registration portion 26. FIG. 7 shows a condition in which these data are written in the storage table 25. In this example, it will be appreciated that the car number of the car receiving the parking ticket number "0001" is "1234", and that the entry time is "10:12".

In Step 52, the parking ticket dispensing machine 7 feeds the parking ticket number data and the entry time data to the central processing unit 16, and in Step 54, this machine 7 checks the operation of the car detector 5 to determine whether or not the car passes past the gate 6 within a predetermined time period, and if the car passes the gate 6, it is judged that the parking is completed, and the entry processing operation is finished. In contrast, it is judged in Step 54 that the car does not actually pass the gate 6, for example, since the entering car leaves the parking lot, the identification of the parking ticket, dispensed in Step 50, is fed to the central processing unit 16 in Step 55, thereby recording the exit of this car. In the central processing unit 16, the stored data of the car, corresponding to this parking ticket number, is deleted from the storage table 25.

Figure 5:
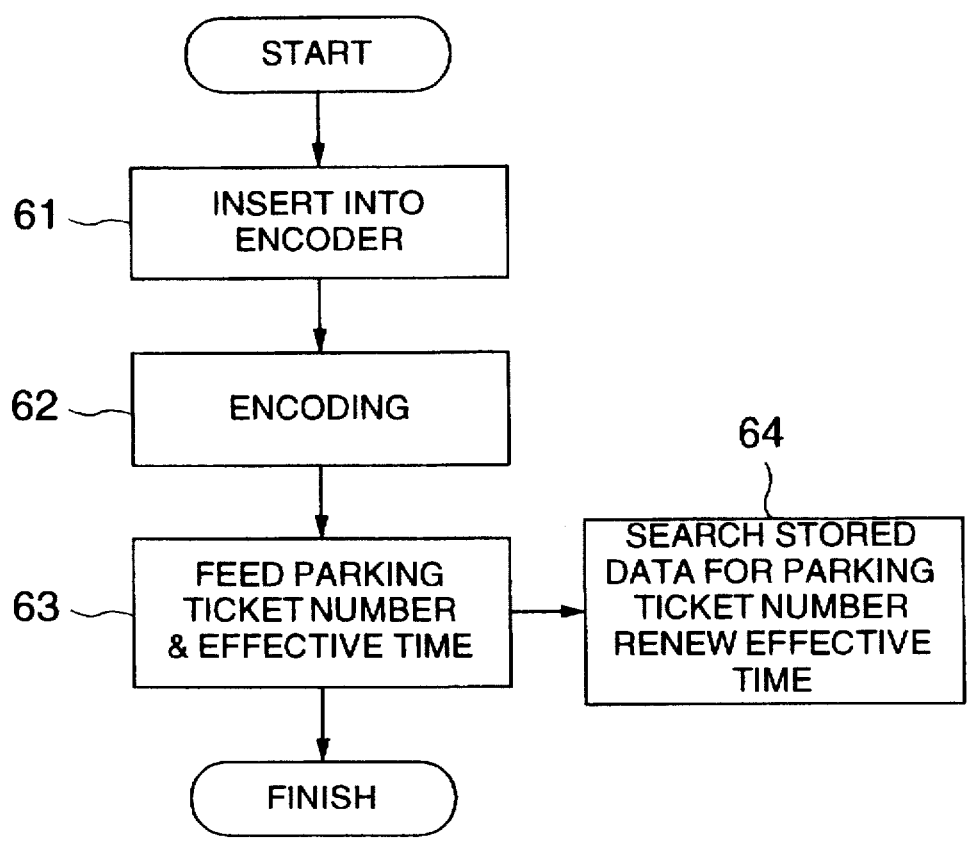
FIG. 5 is a flow chart of an intermediate fee adjustment processing.

An intermediate fee adjustment processing, effected by the parking lot control apparatus, will now be described with reference to a flow chart of FIG. 5. This processing is started when the parking ticket is inserted into a slot in the parking ticket encoder 10 provided at the service counter of a department store or a shopping center. In FIG. 5, when the parking ticket is inserted into the parking ticket encoder 10 in Step 61, an encoding processing is effected in accordance with the parking ticket number in Step 62. Then, in Step 63, the effective parking time for the car is computed. In some cases, this effective parking time is determined uniformly for all cars without condition, and in other cases the effective parking time is determined in accordance with various conditions (Conditions 1 and 2 described above). If the effective parking time is determined in accordance with the above conditions, the receipt is used, and more specifically the receipt is also inserted into the parking ticket encoder 10, so that contents of the receipt are read, or the data contained in the receipt is inputted through operation of keys by the operator. In Step 63, in accordance with the computed effective parking time, the parking ticket encoder 10 calculates the effective time, and feeds data representative of the parking ticket number and data representative of the effective time to the central processing unit 16. In Step 64, the central processing unit 16 makes a search for the parking ticket number data among the data stored in the storage table 25, and writes the effective time into that section of the data writing portion 31a corresponding to the effective time registration portion 29, or renews the data in this section.

With the above processing procedure, until this stage, the car number data, the entry time data and the parking ticket number data have been written respectively into those sections of the data writing portion 31a of the storage table 25 corresponding respectively to the car number registration portion 27, the entry time registration portion 28 and the parking ticket number registration portion 26, and in addition the data representative of the effective parking time has been written into that section of the data writing portion 31 corresponding to the effective time registration portion 29. FIG. 8 shows a condition in which these data are written in the storage table 25. It will be appreciated that the car with the car number "1234", which has received the parking ticket number "0001" by the above processing, is allowed to be parked free of charge for 2 hours from the entry time "10:12" to "12:12". It will also be appreciated from FIG. 8 that another car has received the parking ticket number "0002", and has entered the parking lot after the car with the car number "1234", that the car with the parking ticket number "0002" has the car number "5678", and that the entry time of this car is "10:25". Thus, each time a car enters the parking lot, parking control data thereof is produced, and stored in the storage table 25.

Figure 6:
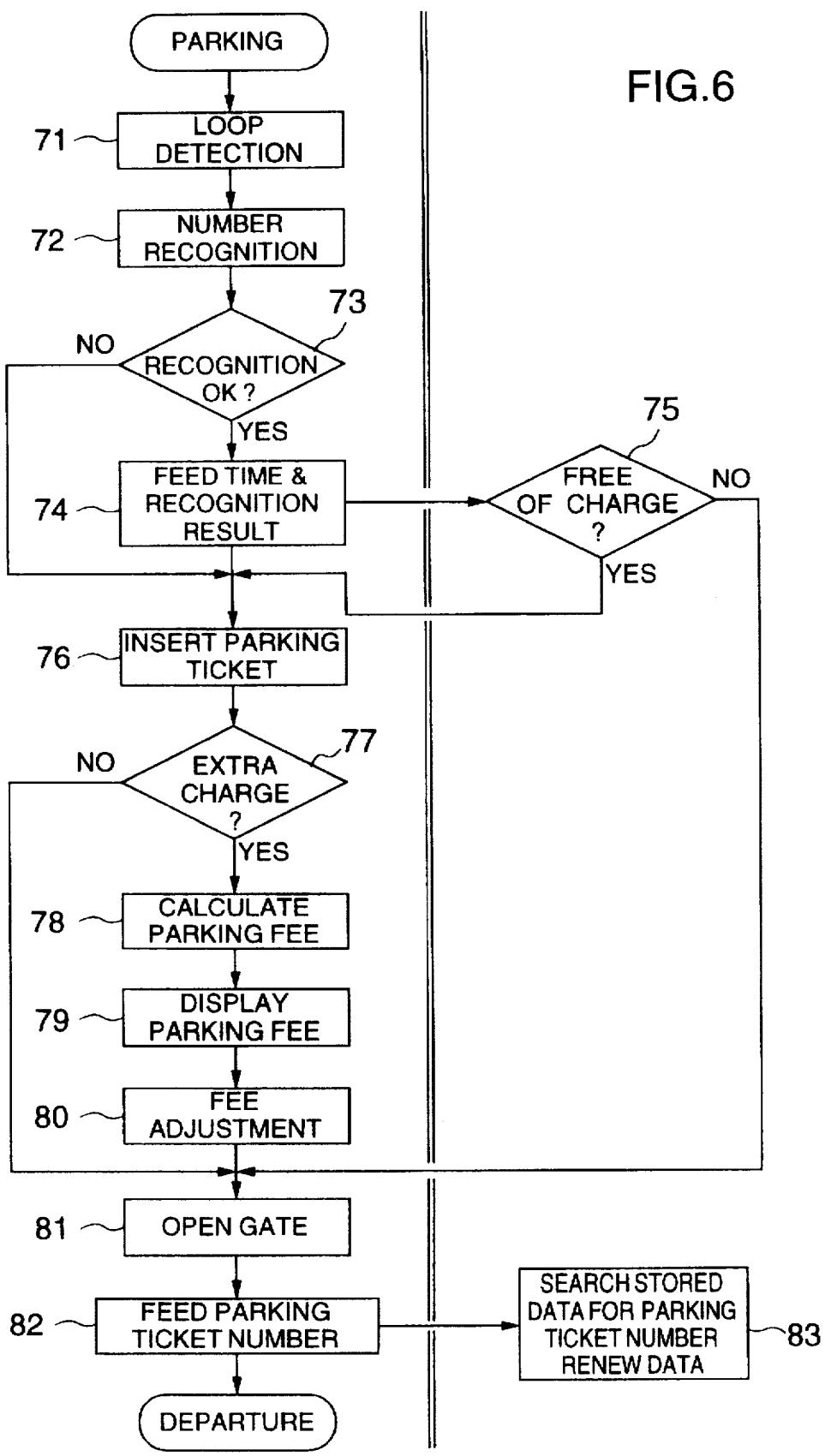
FIG. 6 is a flow chart showing a procedure of the processing effected by the parking lot control apparatus when the car departs from the parking lot.

A procedure of the processing, effected by the parking lot control apparatus when a car departs from the parking lot, will now be described with reference to a flow chart of FIG. 6. In this processing procedure, when the car reaches the exit of the parking lot, the car detector (departing-car detection means) 11 detects the departure of the car, and feeds its detection signal to the number recognition portion 14 (Step 71). Then, in Step 72, the number recognition portion 14 begins a number recognition operation. In this number recognition operation, the number pickup portion 15 is operated in response to an instruction from the number recognition portion 14, and the car pickup camera of this number pickup portion 15 picks up the image of the number plate of the departing car, and data representative of this image is fed to the number recognition portion 14. The number recognition portion 14 effects a character recognition processing in accordance with the thus fed image data, and recognizes the car number.

Then, in Step 73, it is checked whether or not the number recognition has been effected. In this check processing, it is checked whether or not the car number has been perfectly recognized, and if the perfect recognition has been achieved, the processing program proceeds to Step 74 in which data representative of the departure time, as well as data representative of the result of the car number recognition, is fed to the central processing unit 16. In Step 75, it is checked whether or not a fee adjustment processing is required for this departing car. In this Step 75, if this departing car is a contract car, it is judged that the fee adjustment processing is not necessary, and if the car is not a contract car, it is judged that the fee adjustment processing is necessary. If the fee adjustment processing is necessary, and when the parking ticket is inserted into the fully-automatic fee adjustment machine 13 in Step 76, it is checked in Step 77 whether or not any extra charge is required. In this extra charge checking, "there is no extra charge" means that the car is departing from the parking lot before its effective parking time, and "there is an extra charge" means that the car is departing from the parking lot (for example, several minutes) after its effective parking time, in which case an additional parking fee is charged for an excess of time over the time limit.

If it is judged in Step 77 that there is an extra charge, the parking fee is calculated in Step 78, and in Step 79, the parking fee is displayed in a display of the fully-automatic fee adjustment machine 13, and in Step 80, a fee adjustment processing is effected. Then, in Step 81, the gate 12 is opened. If it is judged in Step 75 that the fee adjustment processing is not necessary, the processing program proceeds to Step 81, and the gate 12 is immediately opened without the fee adjustment processing. Therefore, the car is allowed to promptly come out of (that is, departs from) the parking lot. Usually, most customers determine the effective parking time in such a manner that they can depart from the parking lot within the effective parking time so that any extra charge will not be made, and therefore their cars depart from the parking lot promptly and smoothly.

When the gate 12 is opened, the fully-automatic fee adjustment machine 13 feeds the parking ticket number to the central processing unit 16 (Step 82). In Step 83, the central processing unit 16 makes a search for the parking ticket number among the data in the storage table 25, and writes the departure time into the storage table 25, thus renewing the data.

Let's assume that the car with the parking ticket number "0001" departs from the parking lot. With the above processing procedure, until this stage, the car number data, the entry time data, the parking ticket number data and the effective time data have been written respectively into those sections of the data writing portion 31a of the storage table 25 corresponding respectively to the car number registration portion 27, the entry time registration portion 28, the parking ticket number registration portion 26 and the effective time registration portion 29, and in addition the departure time data has been written into that section of the data writing portion 31a corresponding to the departure time registration portion 30. Thus, all the data necessary for the parking control have been written into the storage table 25, and this condition is shown in FIG. 9. It will be appreciated from FIG. 9 that the car with the car number "1234", which had received the parking ticket number "0001", and had been allowed to be parked free of charge for 2 hours from the entry time of "10:12" to "12:12", has departed from the parking lot at "11:55" earlier than the effective parking time. It will also be appreciated from FIG. 9 that the car with the car number "5678", which has received the parking ticket number "0002", is allowed to be parked free of charge for 3 hours from the entry time of "10:25" to "13:25".

In the above embodiment, although only the parking control data for the two cars are written in the storage table 25, this is given merely for illustration purposes, and actually the parking control data for a larger number of cars are written into the storage table in a relative short period of time. In the above embodiment, although the parking fee is calculated based on time (e.g. "effective for 2 hours" and "extension of time of 30 minutes"), it may be calculated based on money (e.g., "basic fee is 200 yen" (paid when the intermediate fee adjustment is effected) and "discount of 100 yen").

As described above, in the present invention, means for picking up the image of the number plate of the car, as well as the car number recognition means, is provided at the entrance of the parking lot, and the image of the number plate of the entering car is picked up, and the car number is recognized, and the parking ticket is dispensed. The car number, the parking ticket number and the entry time are stored in the central processing unit. In the service department (service counter) of the parking lot-containing facility, the intermediate fee adjustment processing or the discount processing is effected in accordance with the parking ticket and the receipt, and the results thereof are stored in the central processing unit. At the exit of the parking lot, the final automatic fee adjustment is effected only when it is necessary, and the departure time of the car (whose recognized number is stored in the central processing unit), and all the data are stored as the storage data in the central processing unit in accordance with the car number and the parking ticket number. Therefore, the entry and departure of the car, and particularly the departure of the car can be effected promptly. And besides, when the car is to enter the parking lot, the car number is compared with the prestored data, and therefore a suspicious car or a car for which the police is searching can be found quite easily. The parking control data are kept stored for a desired period of time, and therefore these data are useful when analyzing the parked cars.

What is claimed is:

1. A parking lot control system comprising:

means provided at an entrance of a parking lot for picking an image of a number plate of a car to enter the parking lot;

means provided at the entrance of the parking lot for recognizing a car number of the entering car;

means provided at the entrance of the parking lot for dispensing a parking ticket;

a central processing unit provided in a control room for storing the car number of the entering car, the number of the parking ticket and a time of entry of the car into the parking lot;

a parking encoder provided at a service department of a parking lot-containing facility for reading the parking ticket and a shopping receipt to obtain data therefrom;

means provided at said service department of said parking lot-containing facility for effecting an intermediate fee adjustment processing or a discount processing in accordance with the data of the receipt obtained by said parking encoder, results of said fee adjustment processing and said discount processing being stored in said central processing unit;

means provided at an exit of the parking lot, for picking up the image of the number plate of the car to depart from the parking lot;

means provided at the exit of the parking lot, for recognizing the car number of the departing car; and means provided at the exit of the parking lot, for automatically effecting a final parking fee adjustment in accordance with the data from said center processing unit.

2. A system according to claim 1, wherein a time of departure of the car (whose number has been recognized) from the parking lot is stored in said central processing unit, and based on the car number and the parking ticket number, all parking information is stored as storage data in said central processing unit.

3. Apparatus according to claim 1, wherein said intermediate fee adjustment processing includes a parking fee discount calculation processing for extending the effective parking time.

4. Apparatus according to claim 3, wherein data representing the car numbers of the contract cars and effective contract time limits thereof, are stored in said reference table.

5. Apparatus according to claim 3, wherein data representing the car numbers of the contract cars and effective contract time limits thereof, as well as data representing car numbers of other specified cars, are stored in said reference table.

6. Apparatus according to claim 3, wherein data representing the number of the parking ticket, the car number of each parked car, the entry time thereof, the effective parking time thereof, and the departure time thereof, are stored in said storage table.

7. Apparatus according to claim 4, wherein data representing the number of the parking ticket, the car number of each parked car, the entry time thereof, the effective parking time thereof, and the departure time thereof, are stored in said storage table.

8. Apparatus according to claim 5, wherein data representing the number of the parking ticket, the car number of each parked car, the entry time thereof, the effective parking time thereof, and the departure time thereof, are stored in said storage table.

* * * * *